United States Patent
Brandon

(10) Patent No.: US 12,030,525 B2
(45) Date of Patent: Jul. 9, 2024

(54) CONTROL OF VEHICLE DRIVING BEHAVIOR TO IMPROVE PROPULSION POWER CONSUMPTION

(71) Applicant: GM Cruise Holdings LLC, San Francisco, CA (US)

(72) Inventor: Jeffrey Brandon, Phoenix, AZ (US)

(73) Assignee: GM Cruise Holdings LLC, San Francisco, CA (US)

( * ) Notice: Subject to any disclaimer, the term of this patent is extended or adjusted under 35 U.S.C. 154(b) by 271 days.

(21) Appl. No.: 17/334,903

(22) Filed: May 31, 2021

(65) Prior Publication Data

US 2022/0379921 A1 Dec. 1, 2022

(51) Int. Cl.
*B60W 60/00* (2020.01)
*B60L 58/12* (2019.01)
*B60W 30/06* (2006.01)
*B60W 40/105* (2012.01)

(52) U.S. Cl.
CPC ......... *B60W 60/0018* (2020.02); *B60L 58/12* (2019.02); *B60W 30/06* (2013.01); *B60W 40/105* (2013.01); *B60W 60/0025* (2020.02); *B60W 2510/244* (2013.01); *B60W 2554/4041* (2020.02); *B60W 2556/45* (2020.02); *B60W 2720/10* (2013.01)

(58) Field of Classification Search
CPC ............. B60W 60/0018; B60W 30/06; B60W 40/105; B60W 60/0025; B60W 2510/244; B60W 2554/4041; B60W 2556/45; B60W 2720/10; B60L 58/12; G05D 1/0011; E02F 9/2054
See application file for complete search history.

(56) References Cited

U.S. PATENT DOCUMENTS

| | | | |
|---|---|---|---|
| 8,284,039 B2 | 10/2012 | Baker et al. | |
| 2009/0224869 A1 | 9/2009 | Baker et al. | |
| 2012/0109515 A1* | 5/2012 | Uyeki | G01C 21/3469 701/423 |
| 2017/0123421 A1 | 5/2017 | Kentley et al. | |
| 2017/0355369 A1* | 12/2017 | La | B60W 30/18072 |
| 2018/0178741 A1* | 6/2018 | Poeppel | B60R 16/0236 |
| 2018/0373268 A1 | 12/2018 | Antunes Marques Esteves | |
| 2019/0204097 A1* | 7/2019 | Starns | G07C 5/008 |
| 2019/0206257 A1* | 7/2019 | Igata | G06Q 10/02 |
| 2019/0232942 A1* | 8/2019 | Liu | B60W 50/0097 |
| 2020/0072626 A1* | 3/2020 | Kumar | G01C 21/3676 |
| 2021/0192405 A1* | 6/2021 | Bristow | G08G 5/0026 |

(Continued)

FOREIGN PATENT DOCUMENTS

JP 2015073369 A * 4/2015

OTHER PUBLICATIONS

Machine Translation of Sugiyama (JP 2015073369 A) (Year: 2015).*

*Primary Examiner* — James J Lee
*Assistant Examiner* — Alexander George Matta

(57) ABSTRACT

The present disclosure provides a method including determining a dispatch state of a vehicle traversing a current route based on data available from a fleet management system associated with the vehicle; selecting a driving dynamics mode for the vehicle based on the determined dispatch state, wherein the driving dynamics mode determines at least one of a route the vehicle is directed to traverse and a driving behavior of the vehicle; and operating the vehicle in the selected driving dynamics mode.

17 Claims, 6 Drawing Sheets

(56) References Cited

U.S. PATENT DOCUMENTS

| | | |
|---|---|---|
| 2021/0240182 A1 | 8/2021 | Brandon et al. |
| 2021/0380126 A1* | 12/2021 | Liu .......................... G08G 1/22 |
| 2022/0375347 A1* | 11/2022 | O'Gorman .............. H04W 4/46 |

* cited by examiner

CONTROL OF VEHICLE DRIVING BEHAVIOR TO IMPROVE PROPULSION POWER CONSUMPTION

TECHNICAL FIELD OF THE DISCLOSURE

The present disclosure relates generally to autonomous vehicles (AVs) and, more specifically, to techniques for controlling various aspects of vehicle driving behavior to reduce the amount of propulsion power required by such vehicles during operation.

BACKGROUND

An autonomous vehicle is a vehicle that is capable of sensing and navigating its environment with little or no user input. An autonomous vehicle may sense its environment using sensing devices such as Radio Detection and Ranging (RADAR), Light Detection and Ranging (LIDAR), image sensors, cameras, camera vision (CV) and the like. An autonomous vehicle system may also use information from a global positioning system (GPS), navigation systems, vehicle-to-vehicle communication, vehicle-to-infrastructure technology, and/or drive-by-wire systems to navigate the vehicle. As used herein, the phrase "autonomous vehicle" includes both fully autonomous and semi-autonomous vehicles.

Many autonomous vehicles are electric or hybrid electric vehicles that include at least one Rechargeable Energy Storage System (RESS), or battery. After extended use of the electric or hybrid electric vehicle, the state of charge of the battery may become low and need to be recharged; accordingly, it is desirable to provide systems and methods that reduce the battery power consumed by the vehicle in order maximize the operational time between battery charges. Other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Figure 1:
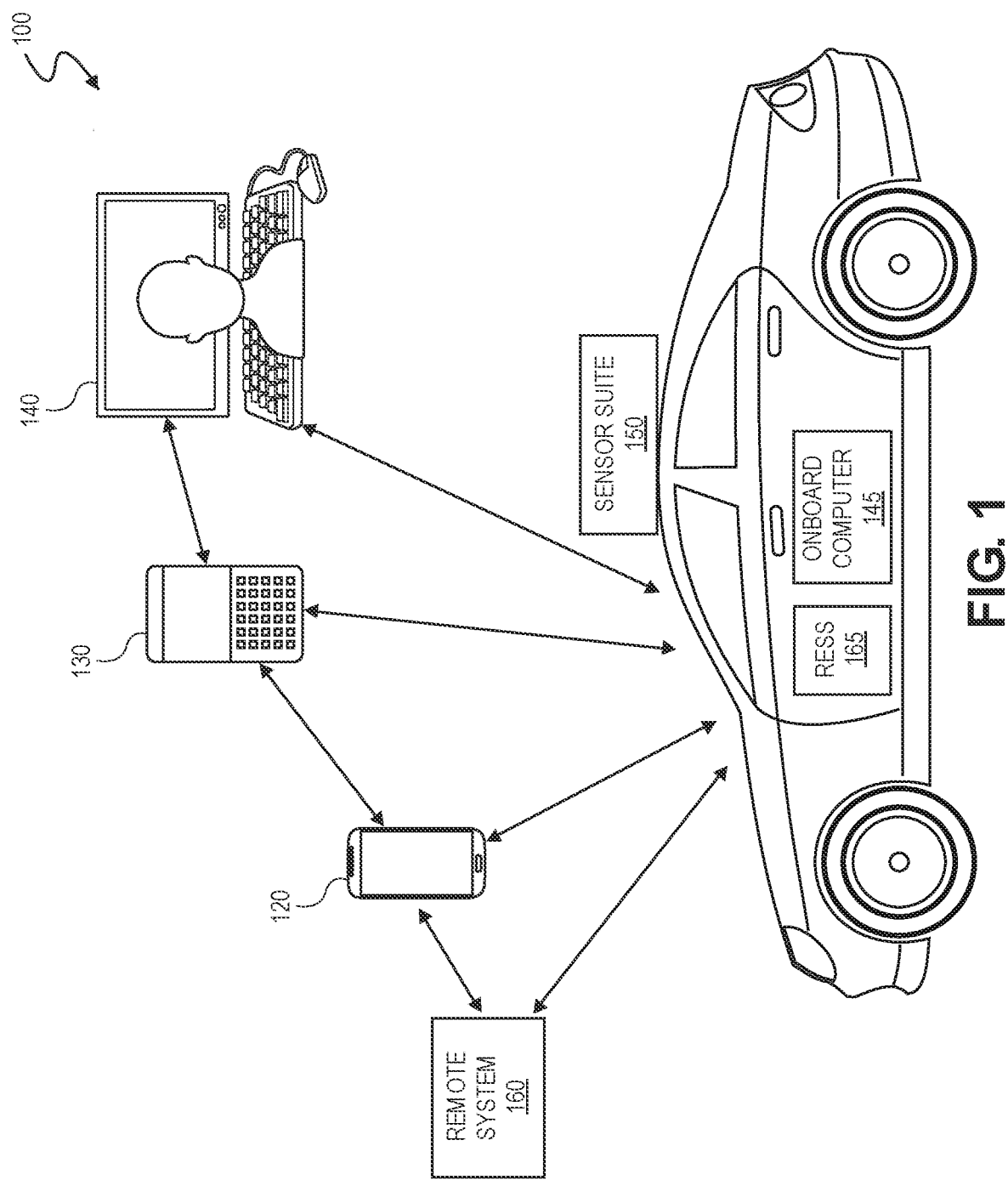
FIG. 1 is a block diagram illustrating an example autonomous vehicle in which a vehicle dynamics control system for optimizing vehicle power consumption according to some embodiments of the present disclosure may be implemented.

The systems, methods, and devices of this disclosure each have several innovative aspects, no single one of which is solely responsible for all of the desirable attributes disclosed herein. Details of one or more implementations of the subject matter described in this specification are set forth in the description below and the accompanying drawings.

Embodiments of the present disclosure provide systems and techniques to reduce the propulsion power consumption of an AV. In particular, techniques described herein reduce AV power consumption while the AV is in operation by causing the AV to operate in an optimized vehicle dynamics mode as may be selectively initiated by the centralized fleet management system and/or the on-board AV perception system. Reduction in AV propulsion power consumption results in a reduction in operating cost of the AV, as well as improved life of the AV's Rechargeable Energy Storage System (RESS), or battery, due to less power being moved through the battery.

During autonomous rideshare and delivery operations, it is critical to pick up and drop off a passenger or delivery in a timely manner; however, there are times during which an AV is not required to drive expeditiously. During those times, the driving behavior of the AV can be altered so as to reduce the power consumed by the AV propulsion system by reducing the average speed and/or acceleration rate of the AV. For example, when an AV is awaiting dispatch and therefore not actively transporting a passenger or delivery, driving with average speeds and acceleration rates that mimic typical human driver behaviors will cause the propulsion system to consume more power than necessary under the circumstances. The additional power consumption results in additional costs associated with battery charging and infrastructure, as well as reduced battery life.

In accordance with features of embodiments described herein, a dispatch command portion of a remote transportation (or fleet management) system may determine that an AV is not transporting a passenger or delivery, for example, and is awaiting dispatch to the next pick-up location. During that time, a centralized routing/traffic congestion system of an AV fleet management system may be leveraged to select drive routes for the AV that provide opportunities for the AV to be operated in a reduced driving dynamics mode in which the AV may be operated at lower average speed and/or acceleration rate and therefore consume less power. For example, the AV may be routed to more congested routes or lanes. Alternatively, the AV may be routed to routes or lanes that safely support slower traffic, e.g., by having lower speed limits and/or slower-moving traffic. Still further, the AV may be instructed to pull over and park, if convenient on-street parking is available. The AV's perception system may also be used to detect situations in which the vehicle can be operated in a reduced driving dynamics mode. Such situations may include situations in which there are no vehicles following the AV, in which case the average speed and/or acceleration rate of the AV may be safely reduced and not impede traffic flow. When the AV is dispatched to pick up a passenger or delivery or the perception system detects vehicles behind the AV, the AV may be instructed to exit reduced driving dynamics mode and to return to normal driving dynamics mode.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

For purposes of explanation, specific numbers, materials, and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense. For convenience, if a collection of drawings designated by the same number and different letters is presented (e.g., FIGS. 1A-1D), the collection may be referred to herein without the letters (e.g., FIG. 1). Similarly, if a collection of elements designated by the same reference numeral and different letters are presented in the drawings (e.g., elements 10a-10n), the collection may be referred to herein without the letters (e.g., element 10).

Other features and advantages of the disclosure will be apparent from the following description and the claims.

One embodiment is a driving dynamics control system for reducing the power consumption of an AV. In particular embodiments, and at a high level, the driving dynamics control system determines a dispatch state (e.g., dispatched or awaiting dispatch) of the AV and selectively causes the AV to operate in one of a normal driving dynamics mode or a reduced driving dynamics mode depending on the dispatch state. In certain embodiments, if the AV is in a dispatched state, the AV is caused to operate in normal driving dynamics mode. In contrast, if the AV is in an awaiting dispatch state, the AV is caused to operate in a reduced driving dynamics mode, as will be described in greater detail below.

As shown in FIG. 1, a driving dynamics control system 100 embodying features described herein includes an autonomous vehicle 110 that may include a passenger interface 120, a vehicle coordinator 130, and/or a remote expert interface 140. In certain embodiments, the remote expert interface 140 allows a non-passenger entity to set and/or modify the behavior settings of the autonomous vehicle 110. The non-passenger entity may be different from the vehicle coordinator 130, which may be a server.

A remote control facility 160, which may comprise a central office or back office facility, may also be provided for providing the autonomous vehicle 110 (and particularly, the onboard computer 145) with a number of different system backend functions. The remote control facility 160 may include one or more switches, servers, databases, live advisors, and/or an automated voice response system ("VRS"). Remote control facility 160 may include any or all of the aforementioned components, which may be coupled to one another via a wired or wireless local area network (LAN). Remote control facility 160 may receive and transmit data via one or more appropriate devices and network from and to the autonomous vehicle 110, such as by wireless systems, such as 882.11x, GPRS, and the like. A database at the remote control facility 160 can store account information such as subscriber authentication information, vehicle identifiers, profile records, behavioral patterns, and other pertinent subscriber information. The remote control facility 160 may also include a database of roads, routes, locations, etc. permitted for use by autonomous vehicle 110. The remote control facility 160 may communicate with the autonomous vehicle 110 to provide route guidance proactively and/or in response to a request received from the vehicle.

For example, based upon information stored in a mapping system of the remote control facility 160, the remote control facility may determine the conditions of various roads or portions thereof. Autonomous vehicles, such as the autonomous vehicle 110, may, in the course of determining a navigation route, receive instructions from the remote control facility 160 regarding which roads or portions thereof, if any, are appropriate for use under certain circumstances, as described hereinbelow. Such instructions may be based in part on information received from the autonomous vehicle 110 or other autonomous vehicles regarding road conditions Accordingly, remote control facility 160 may receive information regarding the roads/routes generally in real-time from one or more vehicles.

The system 100 functions to adjust driving behavior of the autonomous vehicle 110 in response to a current dispatch state of the vehicle in order to reduce the propulsion power required by the autonomous vehicle during operation, thereby to decrease vehicle (and fleet) operating costs and extend the life of an RESS 165 of the autonomous vehicle.

The autonomous vehicle 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In some embodiments, the autonomous vehicle 110 may optionally include one or more of a throttle interface that controls an engine throttle, motor speed (e.g., rotational speed of electric motor), or any other movement-enabling mechanism; a brake interface that controls brakes of the autonomous vehicle (or any other movement-retarding mechanism); and a steering interface that controls steering of the autonomous vehicle (e.g., by changing the angle of wheels of the autonomous vehicle). The autonomous vehicle 110 may additionally or alternatively include interfaces for control of any other vehicle functions; e.g., windshield wipers, headlights, turn indicators, air conditioning, etc. One or more of the aforementioned interfaces, if deployed, may be controlled via human or non-human driver input.

In addition, the autonomous vehicle 110 preferably includes an onboard computer 145 and a sensor suite 150 (e.g., computer vision ("CV") system, Light Detection and Ranging (LIDAR), Radio Detection and Ranging (RADAR), wheel speed sensors, Global Positioning System (GPS), cameras, etc.). The onboard computer 145 functions to control the autonomous vehicle 110 at least partially in accordance with instructions received from the remote system 160 and processes sensed data from the sensor suite 150 and/or other sensors in order to determine the operational state of the autonomous vehicle 110. Based upon the vehicle operational state and programmed instructions, the onboard computer 145 preferably modifies or controls driving behavior of the autonomous vehicle 110. The onboard computer 145 and sensor suite 150 collectively comprise a perception system of the autonomous vehicle 110.

Driving behavior may include any information relating to how an autonomous vehicle drives (e.g., actuates brakes, accelerator, steering) given a set of instructions (e.g., a route or plan). Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, action profiles (e.g., how a vehicle turns, changes lanes, or performs a driving maneuver), and action frequency constraints (e.g., how often a vehicle changes lanes).

The onboard computer 145 functions to control the operations and functionality of the autonomous vehicle 110 and processes sensed data from the sensor suite 150 and/or other sensors in order to determine states of the autonomous vehicle. Based upon the vehicle state and programmed instructions, the onboard computer 145 preferably modifies or controls behavior of autonomous vehicle 110. The onboard computer 145 is preferably a general-purpose computer adapted for I/O communication with vehicle control systems and sensor systems but may additionally or alternatively be any suitable computing device. The onboard computer 145 is preferably connected to the Internet via a wireless connection (e.g., via a cellular data connection). Additionally or alternatively, the onboard computer 145 may be coupled to any number of wireless or wired communication systems.

The sensor suite 150 preferably includes localization and driving sensors; e.g., photodetectors, cameras, RADAR, Sound Navigation Ranging (SONAR), LIDAR, GPS, inertial measurement units (IMUS), accelerometers, microphones, strain gauges, pressure monitors, barometers, thermometers, altimeters, etc.

In certain embodiments, information collected by autonomous vehicles, such as autonomous vehicle 110, may be provided to the remote facility 160, which may establish a database or map of routes in a given area or region where use of an autonomous driving system may be permitted. Information such as traffic data and/or road conditions may be collected from vehicles in real-time, i.e., as the vehicle(s) traverses the route(s) in question. Information may be analyzed by a central office of the remote facility 160 in real-time, or on a periodic basis. The information may be provided to vehicles collectively in the area, e.g., by way of a central database or map. For example, vehicles may pull route information from the database/map to determine appropriate route(s) for use of an autonomous driving system in any manner that is convenient. In some examples, a vehicle telematics unit may selectively communicate with the remote facility to determine whether a route may be used with an autonomous driving system. In accordance with another aspect of the invention, there is provided a system for communicating with a plurality of vehicles may include a plurality of telematics units installed into each of the vehicles. The telematics units are configured to collect route information (e.g., traffic conditions, road conditions) as the vehicles are traveling along a vehicle route. The collected information may be used along with the map data to determine routes for various ones of the vehicles.

Figure 2:
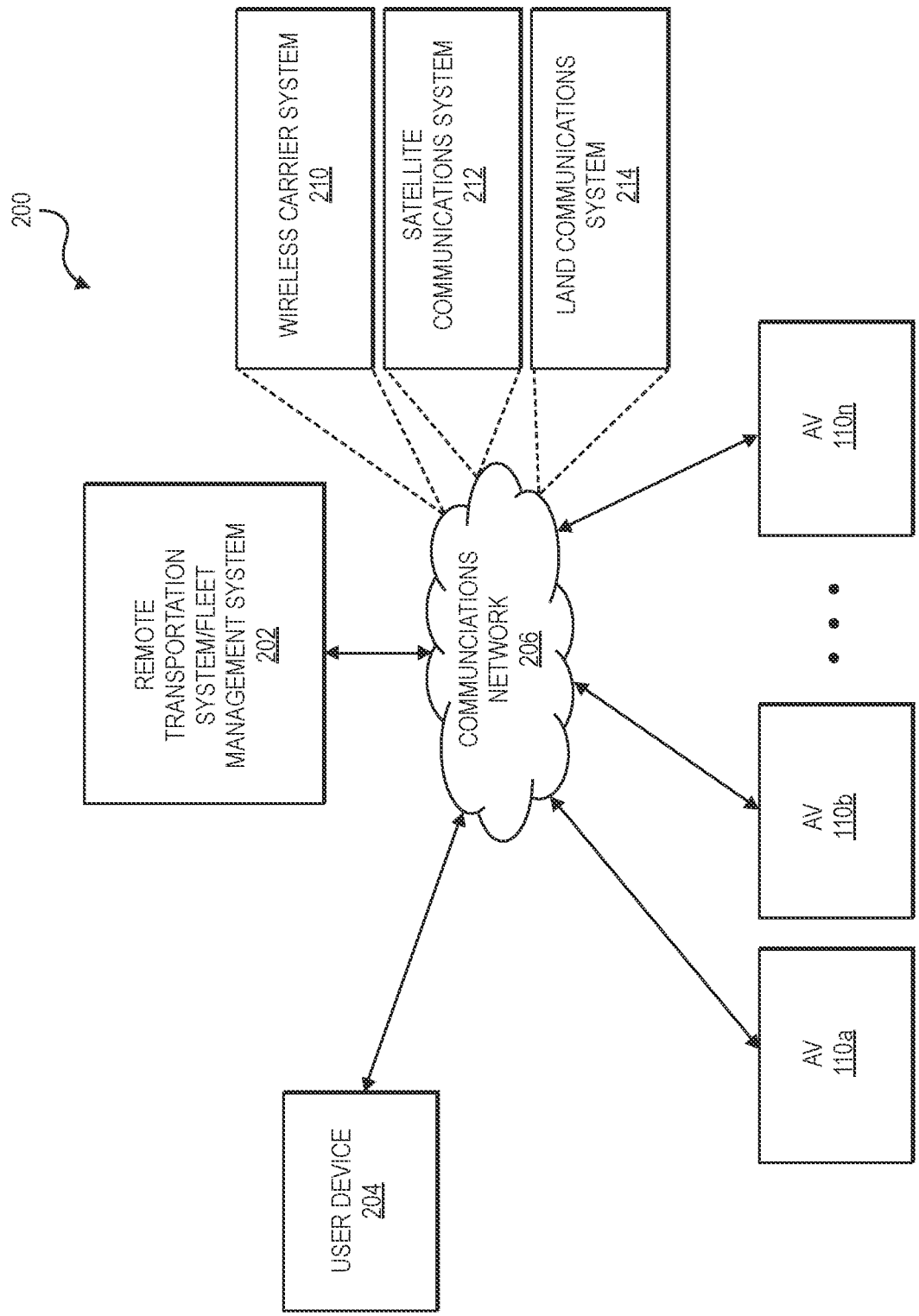
FIG. 2 is a functional block diagram illustrating an operating environment for providing instructions to one or more autonomous vehicles described with reference to FIG. 1 in which a vehicle dynamics control system for optimizing of vehicle power consumption according to some embodiments of the present disclosure may be implemented.

With reference now to FIG. 2, in various embodiments, the autonomous vehicle 110 described in connection with FIG. 1 may be suitable for use in the context of a taxi, shuttle, or delivery system in a certain geographical area (e.g., a city, a school or business campus, a shopping center, an amusement park, an event center, or the like) or may simply be managed by a remote system. For example, the autonomous vehicle 110 may be associated with an autonomous vehicle based remote transportation system comprising a fleet management system. FIG. 2 illustrates an exemplary embodiment of an operating environment 200 that includes an autonomous vehicle based remote transportation system 202 including a fleet management system associated with one or more autonomous vehicles 110a-110n as described with reference to FIG. 1.

In various embodiments, the operating environment 200 further includes one or more user devices, represented in FIG. 2 by a user device 204, that communicate with the autonomous vehicle 110 and/or the remote transportation system 202 via a communication network 206. The communication network 206 supports communication as needed between devices, systems, and components supported by the operating environment 200 (e.g., via tangible communication links and/or wireless communication links). For example, the communication network 206 may include a wireless carrier system 210, such as a cellular telephone system that includes a plurality of cell towers (not shown), one or more mobile switching centers (MSCs) (not shown), as well as any other networking components required to connect the wireless carrier system 210 with a land communications system. Each cell tower includes sending and receiving antennas and a base station, with the base stations from different cell towers being connected to the MSC either directly or via intermediary equipment such as a base station controller. The wireless carrier system 210 may implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 210. For example, the base station and cell tower may be co-located at the same site or be remotely located from one another, each base station may be responsible for a single cell tower or a single base station may service various cell towers, or various base stations may be coupled to a single MSC, to name but a few of the possible arrangements.

A second wireless carrier system in the form of a satellite communication system 212 may be provided to support uni-directional or bi-directional communication with the autonomous vehicles 110a-110n. The satellite communication system may include one or more communication satellites (not shown) and an uplink transmitting station (not shown). Uni-directional communication may include, for example, satellite radio services, wherein programming content (news, music, etc.) is received by the transmitting station, packaged for upload, and then sent to the satellite, which broadcasts the programming to subscribers. Bi-directional communication may include, for example, satellite telephony services using the satellite to relay telephone communications between the vehicle 110 and the station. The satellite system 212 may be utilized either in addition to or in lieu of the wireless carrier system 210.

A land communication system 214 comprising a conventional land-based telecommunications network connected to one or more landline telephones may further be included for connecting the wireless carrier system 210 to the remote transportation system 202. For example, the land communication system 214 may include a public switched telephone network (PSTN) such as that used to provide hardwired telephony, packet-switched data communications, and the Internet infrastructure. One or more segments of the land communication system 214 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 202 need not be connected via the land communication system 214 but may include wireless telephony equipment for communicating directly with a wireless network, such as the wireless carrier system 210.

Although only one user device 204 is shown in FIG. 2, embodiments of the operating environment 200 may support any number of user devices 204, including multiple user devices 204 owned, operated, or otherwise used by one person. Each user device 204 supported by the operating environment 200 may be implemented using any suitable hardware platform. In this regard, the user device 204 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 204 supported by the operating environment 200 is realized as a computer-implemented or computer-based device having the hardware, software, firmware, and/or processing logic needed to carry out the various techniques and methodologies described herein. For example, the user device 204 includes a microprocessor in the form of a programmable device that includes one or more instructions stored in an internal memory structure and applied to receive binary input to create binary output. In some embodiments, the user device 204 includes a GPS module capable of receiving GPS satellite signals and generating GPS coordinates based on those signals. In other embodiments, the user device 204 includes cellular communications functionality such that the device carries out voice and/or data communications over the communication network 206 using one or more cellular communications protocols, as are discussed herein. In various embodiments, the user device 204 includes a visual display, such as a touch-screen graphical display, or other display.

The remote transportation system 202 may include one or more backend server systems, which may be cloud-based, network-based, or resident at the particular campus or geographical location serviced by the remote transportation system 202. The remote transportation system 202 may be manned by a live advisor, or an autonomous advisor, or a combination of both. The remote transportation system 202 may communicate with the user devices 204 and the autonomous vehicles 110a-110n to schedule rides, dispatch autonomous vehicles 110a-110n, and the like. In various embodiments, the remote transportation system 202 may store account information, such as subscriber authentication information, vehicle identifiers, profile records, behavioral patterns, and other pertinent subscriber information.

As may be appreciated, the subject matter disclosed herein provides certain enhanced features and functionality to what may be considered as a standard or baseline autonomous vehicle and/or an autonomous vehicle based remote transportation system. To this end, an autonomous vehicle and autonomous vehicle based remote transportation system can be modified, enhanced, or otherwise supplemented to provide the additional features described in more detail below.

Figure 3:
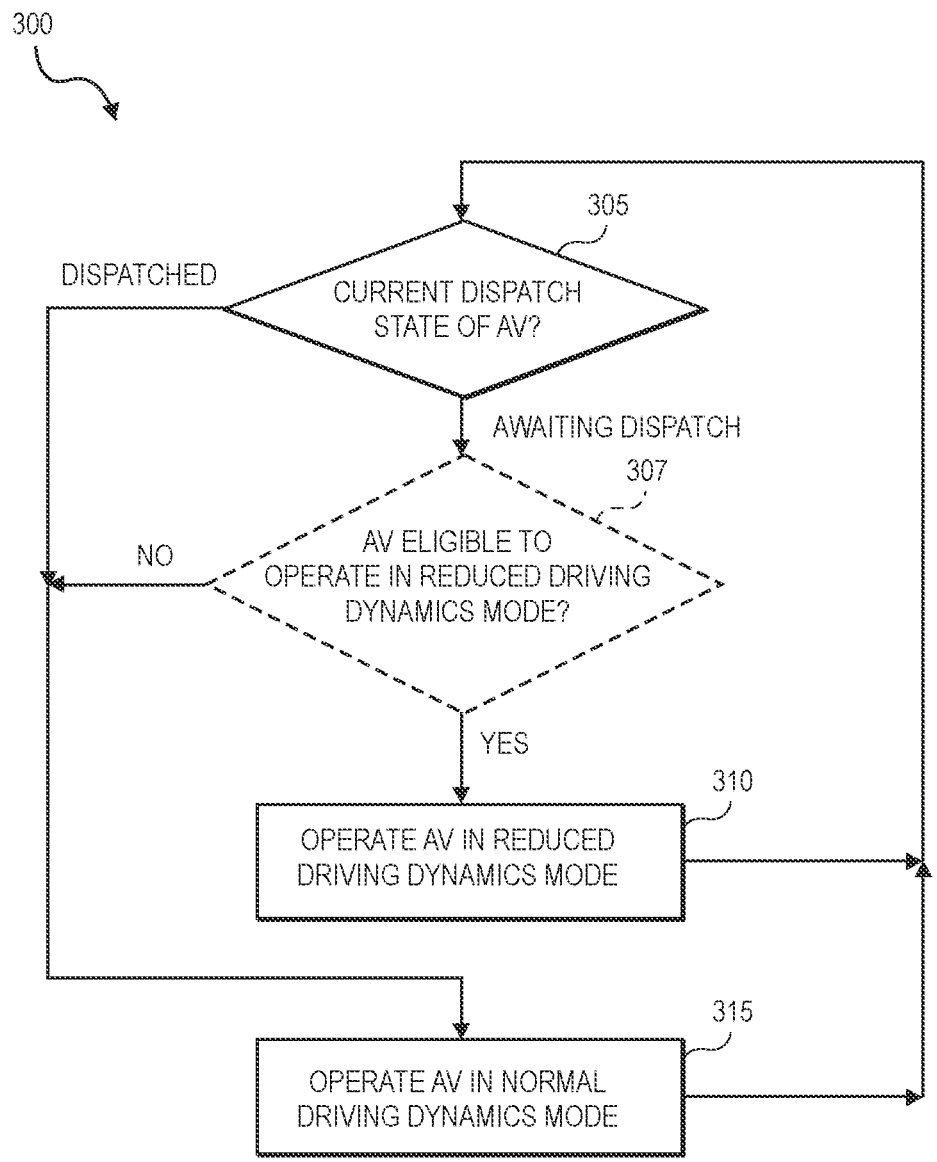
FIG. 3 is a flowchart of a method for optimizing of vehicle power consumption according to some embodiments of the present disclosure.

FIG. 3 is a flowchart of a method 300 that may be implemented by an example driving dynamics control system for an autonomous vehicle according to some embodiments described herein. Referring to FIG. 3, in step 305, a current dispatch status of the autonomous vehicle (e.g., autonomous vehicle 110) is determined. Examples of possible autonomous vehicle dispatch statuses include (1) awaiting dispatch (i.e., neither assigned to pick up a passenger or delivery from a pick up location nor actively transporting a passenger or delivery from a pick up location to a drop off location) and (2) dispatched (i.e., either assigned to pick up a passenger or delivery from a pick up location or actively transporting a passenger or delivery from a pick up location to a drop off location). In certain embodiments, the dispatch mode of the AV may be determined by the fleet management system to which the AV is assigned.

If it is determined in step 305 that the dispatch status of the AV is "awaiting dispatch," execution may proceed to optional step 307.

In optional step 307, a determination is made whether the AV is eligible to operate in reduced driving dynamics mode. In particular, in accordance with features of certain embodiments, it may be desirable for the remote transportation/fleet management system to limit the maximum number of AVs of a fleet of AVs that are eligible to operate in reduced driving dynamics mode at any given time to a percentage of the total fleet. For example, during high service demand hours (e.g., rush hour), it may be desirable to limit the maximum number of AVs that are eligible to operate in reduced driving dynamics mode at a given time to 10% of the fleet, whereas during low demand hours (e.g., 3:00 AM-5:00 AM), the maximum number of AVs eligible to operate in reduced driving dynamics mode at a given time may be 70% of the fleet. In such cases, individual AVs that are eligible to operate in the reduced driving dynamics mode (and thus count toward the maximum number comprising the designated percentage of the fleet) may be selected on the basis of meeting certain criteria, such as having a remaining battery life below a certain minimum battery level threshold and/or having a battery health below a certain minimum battery health threshold. Additionally and/or alternative, individual AVs may be selected on the basis of geographic location, with AVs traversing low demand areas, areas in which on-street parking is plentiful, and/or areas in which speed limits are low, being more likely to be eligible to operate in reduced driving dynamics mode.

If it is determined in optional step 307 that the AV is eligible to operate in reduced driving dynamics mode (or if optional step 307 is omitted), execution proceeds to step 310.

In step 310, the AV is instructed to operate in reduced driving dynamics mode. In reduced driving dynamics mode, various efforts are made by the fleet management system and/or the AV perception system to reduce the average speed and/or acceleration rate of the AV. Examples of actions/steps that may be taken to reduce the average speed and/or acceleration rate of the AV during operation will be described in greater detail below with reference to FIGS. 4A and 4B.

Upon completion of step 310, execution returns to step 305.

If it is determined in step 305 that the dispatch status of the AV is "dispatched," execution proceeds to step 315. Similarly, if in optional step 307 it is determined that the AV is not eligible to operate in reduced driving dynamics mode, execution proceeds to step 315.

In step 315, the AV is instructed to operate in normal driving dynamics mode, in which the AV is instructed to proceed to the destination in accordance with normal operations. Normal operations may include directing the AV to a route comprising, for example, one or more of the fastest route segments, the safest route segments, the most comfortable route segments, route segments designated by a user, route segments exhibiting a combination of one or more of the aforementioned considerations, and/or other route segments selected without particular and/or primary regard to the propulsion power required to traverse the one or more route segments. Normal operations may also include directing the AV to routes and/or route segments that result in a reduction of power consumption per unit of distance traveled (e.g., mile, kilometer).

Upon completion of step 315, execution returns to step 305.

Figure 4A:
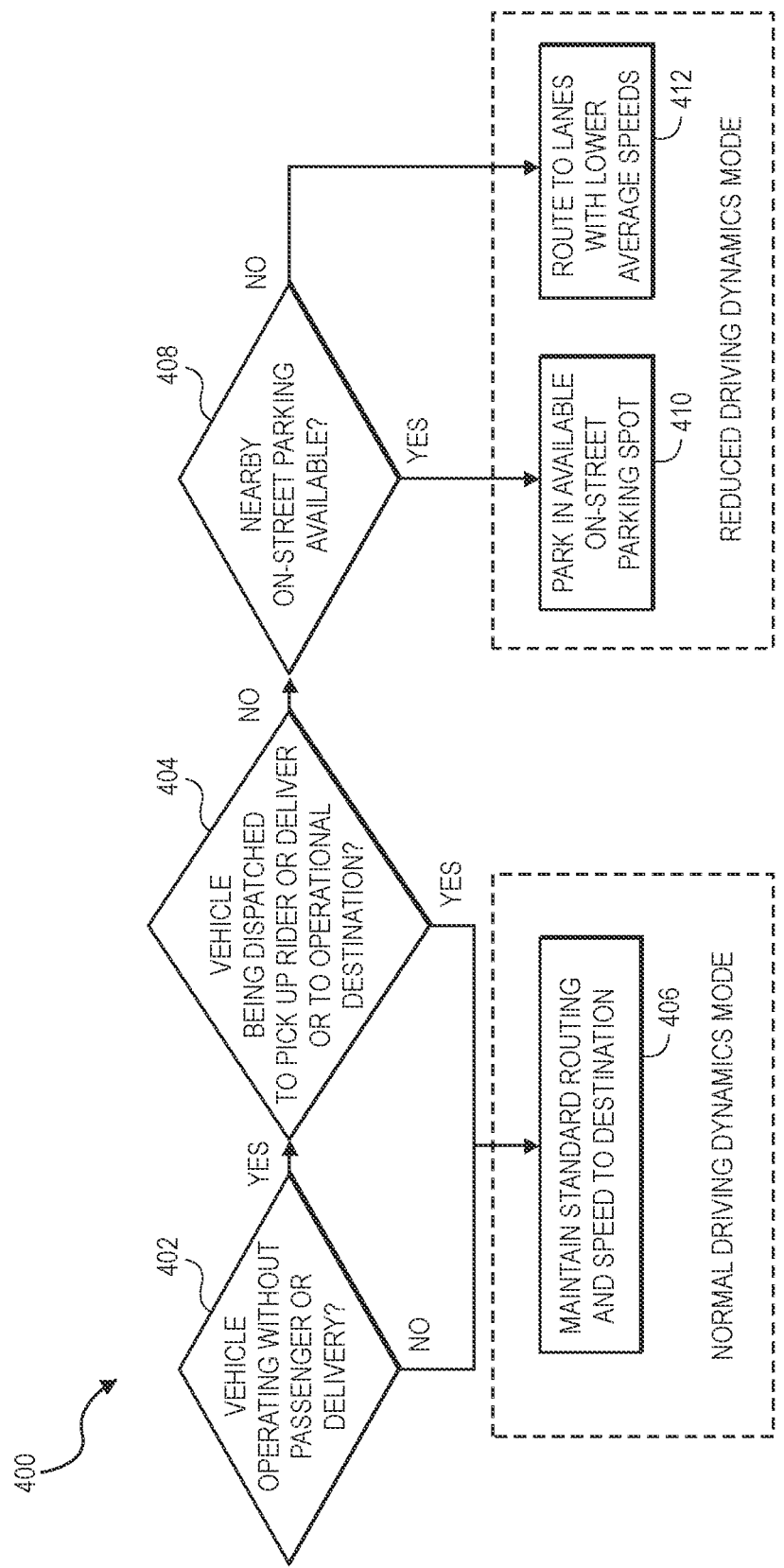
FIG. 4A is a flow diagram illustrating an example implementation of the method of FIG. 3 for optimizing of vehicle power consumption according to some embodiments of the present disclosure.
Figure 4B:
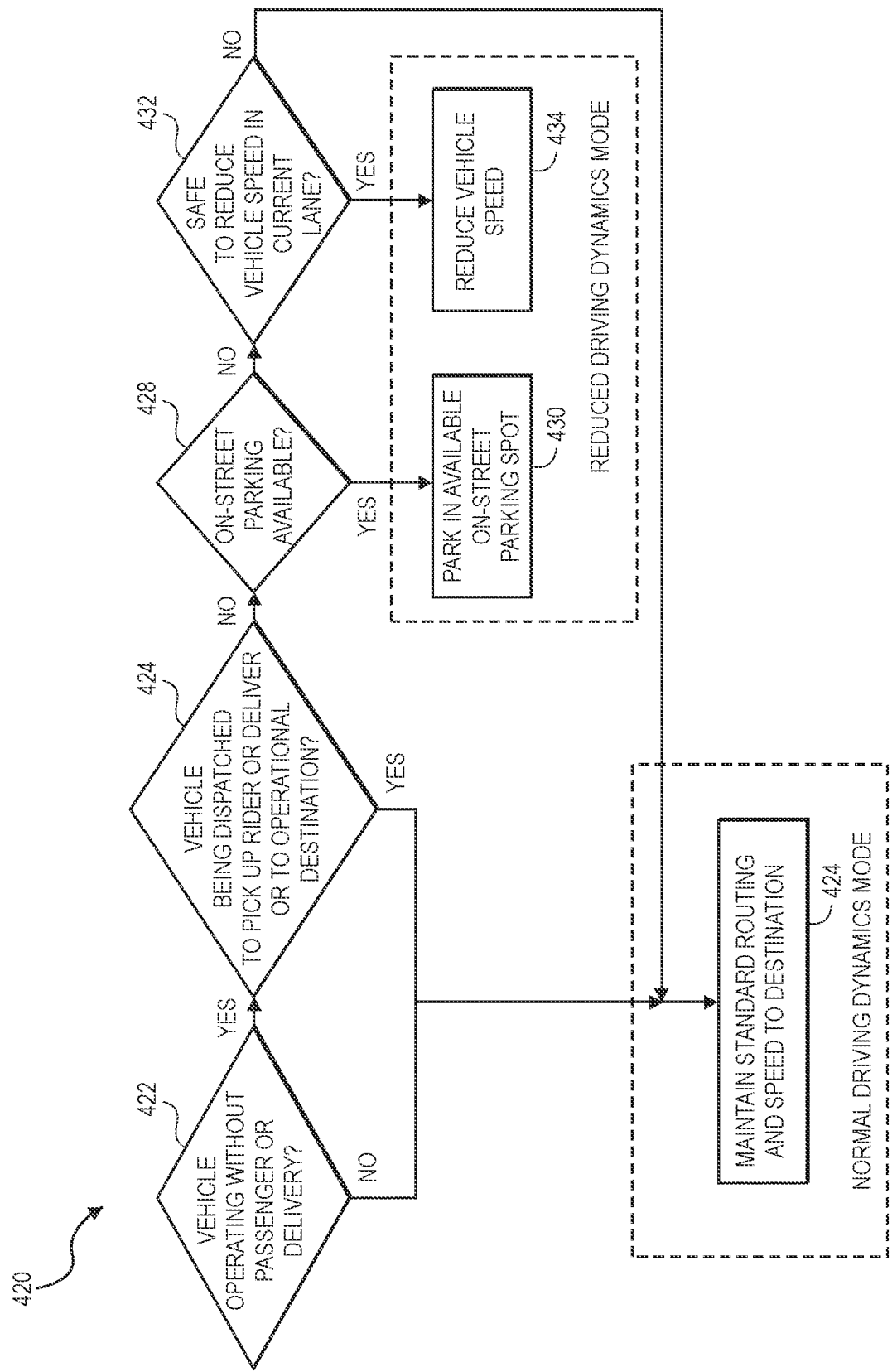
FIG. 4B is a flow diagram illustrating another example implementation of the method of FIG. 3 for optimizing of vehicle power consumption according to some embodiments of the present disclosure.

FIGS. 4A and 4B illustrate examples of reduced driving dynamics mode solutions for reducing the average speed and/or acceleration rate of an AV during operation thereof. It will be assumed for both of the solutions illustrated in FIGS. 4A and 4B that the AV is eligible to operate in reduced driving dynamics mode, either because it has been determined to be or because all of the AVs in the particular fleet are so eligible.

Referring to FIG. 4A, depicted therein is a flow diagram illustrating an on-street parking solution 400 in accordance with certain embodiments.

As shown in FIG. 4A, in step 402, a determination is made whether the AV is operating without a passenger or delivery. In certain embodiments, this determination may be made by and/or in consultation with the remote transportation/fleet management system. If a positive determination is made in step 402, execution proceeds to step 404. If a negative determination is made in step 402, execution proceeds to step 406.

In step 404, a determination is made whether the AV is being dispatched to pick up a passenger or delivery or to an operational destination (i.e., for service). In certain embodiments, this determination may be made by and/or in consultation with the remote transportation/fleet management system. If a positive determination is made in step 404, execution proceeds to step 406.

In step 406, the AV is instructed by the remote transportation/fleet management system to maintain the standard routing and speed to the destination. In other words, the AV is instructed to operate in normal driving dynamics mode.

If it is determined in step 404 that the AV is not being dispatched to pick up a passenger or delivery or to an operational destination (i.e., for service), execution proceeds to step 408.

In step 408, a determination is made whether on-street parking is available nearby (e.g., within a designated distance from the current location of the AV). In certain embodiments, this determination may be made by and/or in consultation with the remote transportation/fleet management system. If a positive determination is made in step 408, execution proceeds to step 410; otherwise, execution proceeds to step 412.

In step 410, the AV is instructed by the remote transportation/fleet management system to park in the available nearby on-street parking spot.

In step 412, the AV is routed by the remote transportation/fleet management system to lanes/route segments with lower average speeds and/or acceleration rate. In other words, the AV is instructed to operate in reduced driving dynamics mode. This may be accomplished in step 412 by routing the AV to lanes that are experiencing more traffic congestion (as may be determined by the remote transportation/fleet management system with reference to real-time traffic information received from the AV fleet and/or other systems), and therefore must be traversed at lower average speeds and/or acceleration rate, for example. Additionally and/or alternatively, this may be accomplished in step 412 by routing the AV to routes that have lower speed limits (as may be determined by the remote transportation/fleet management system with reference to map data).

Referring now to FIG. 4B, depicted therein is a flow diagram illustrating a reduced operating speed and/or acceleration rate solution 420 in accordance with certain embodiments.

As shown in FIG. 4B, in step 422, a determination is made whether the AV is operating without a passenger or delivery. In certain embodiments, this determination may be made by and/or in consultation with the remote transportation/fleet management system. If a positive determination is made in step 422, execution proceeds to step 424. If a negative determination is made in step 422, execution proceeds to step 426.

In step 424, a determination is made whether the AV is being dispatched to pick up a passenger or delivery or to an operational destination (i.e., for service). In certain embodiments, this determination may be made by and/or in consultation with the remote transportation/fleet management system. If a positive determination is made in step 424, execution proceeds to step 426.

In step 426, the AV is instructed by the remote transportation/fleet management system to maintain the standard routing to the destination. In other words, the AV is instructed to operate in normal driving dynamics mode.

If it is determined in step 424 that the AV is not being dispatched to pick up a passenger or delivery or to an operational destination (i.e., for service), execution proceeds to step 428.

In step 428, a determination is made whether on-street parking is available nearby (e.g., within a designated distance from the current location of the AV). In certain embodiments, this determination may be made by and/or in consultation with the remote transportation/fleet management system. If a positive determination is made in step 428, execution proceeds to step 430; otherwise, execution proceeds to step 432.

In step 430, the AV is instructed by the remote transportation/fleet management system to park in the available nearby on-street parking spot.

In step 432, a determination is made whether it is safe to reduce the speed and/or acceleration rate of the AV in the current lane. In certain embodiments, this determination may by/in consultation with the perception system of the AV to determine whether there are other vehicles in the same lane behind the AV, in which case, slowing down may cause safety hazards and/or inconvenience the other vehicles. If a negative determination is made in step 432, execution returns to step 426; otherwise, execution proceeds to step 434.

In step 434, the AV remains in the current lane and its operational speed and/or acceleration rate are reduced to a level appropriate to the driving situation in the lane/along the route. It will be recognized that the operational speed and/or acceleration rate of the AV may be readjusted if the driving situation in the current lane changes (e.g., if the perception system detects a vehicle approaching from behind the AV in the same lane, in which case the AV may need to increase its operational speed to the minimum speed limit, for example). If the situation persists, the AV may be instructed to return to standard routing and average speed and/or acceleration rate en route to the destination (step 426).

It will be recognized that elements of the examples shown in FIGS. 4A and 4B may be combined with one another and/or omitted altogether without departing from the spirit or scope of the embodiments described herein. It will further be recognized that the examples shown in FIGS. 4A and 4B are not intended to be exhaustive but are merely representative of various driving behaviors that may be modified to implement a reduced driving dynamics mode in which less propulsion power is required during AV operation than in a normal driving dynamics mode.

Figure 5:
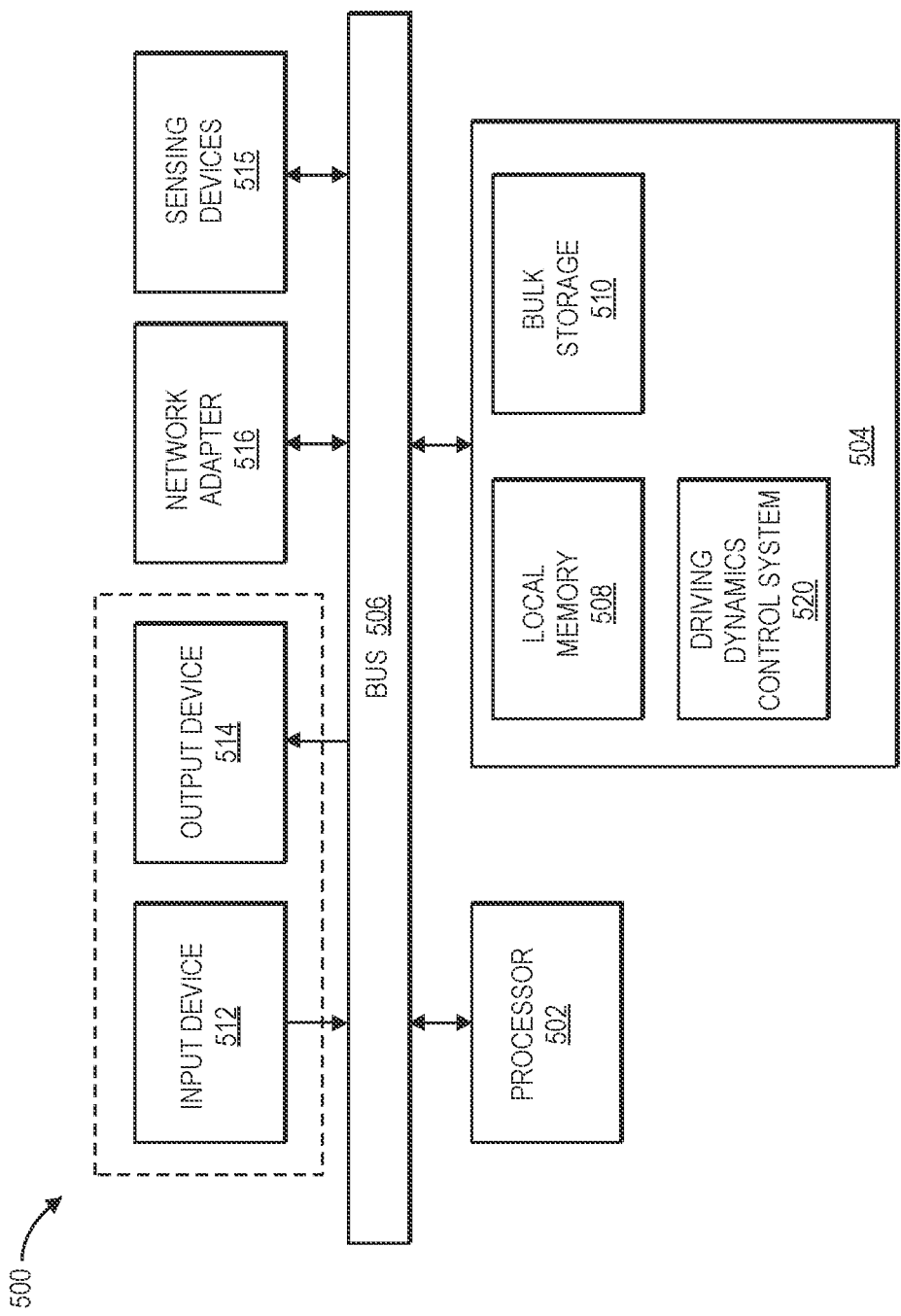
FIG. 5 is a block diagram of a computer system that may be used to implement a vehicle dynamics control system for optimizing vehicle power consumption according to some embodiments of the present disclosure.

FIG. 5 is a block diagram illustrating an example system 500 that may be configured to implement at least portions of driving dynamics control system for an autonomous vehicle, such as the autonomous vehicle 110, in accordance with embodiments described herein, and more particularly as shown in the FIGURES described hereinabove. Part or all of the system 500 may be implemented as a sensor suite, such as the sensor suite 150, and/or an onboard vehicle control system, such as onboard computer 145, and/or a remote vehicle control system, such as remote control facility 160. As shown in FIG. 5, the system 500 may include at least one processor 502, e.g. a hardware processor, coupled to memory elements 504 through a system bus 506. As such, the system may store program code and/or data within memory elements 504. Further, the processor 502 may execute the program code accessed from the memory elements 504 via a system bus 506. In one aspect, the system may be implemented as a computer that is suitable for storing and/or executing program code (e.g., onboard computer 145). It should be appreciated, however, that the system 500 may be implemented in the form of any system including a processor and a memory that is capable of performing the functions described in this disclosure.

In some embodiments, the processor 502 can execute software or an algorithm to perform the activities as discussed in this specification; in particular, activities related to an intelligent delivery system for an autonomous vehicle in accordance with embodiments described herein. The processor 502 may include any combination of hardware, software, or firmware providing programmable logic, including by way of non-limiting example a microprocessor, a DSP, a field-programmable gate array (FPGA), a programmable logic array (PLA), an integrated circuit (IC), an application specific IC (ASIC), or a virtual machine processor. The processor 502 may be communicatively coupled to the memory element 504, for example in a direct-memory access (DMA) configuration, so that the processor 502 may read from or write to the memory elements 504.

In general, the memory elements 504 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked, or sent to or from any of the components of the system 500 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures may also include suitable interfaces for receiving, transmitting, and/or otherwise communicating data or information in a network environment so that they can communicate with, for example, a system having hardware similar or identical to another one of these elements.

In certain example implementations, mechanisms for implementing an intelligent delivery system for an autonomous vehicle as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 504 shown in FIG. 5, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 502 shown in FIG. 5, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 504 may include one or more physical memory devices such as, for example, local memory 508 and one or more bulk storage devices 510. The local memory may refer to RAM or other non-persistent memory device(s) generally used during actual execution of the program code. A bulk storage device may be implemented as a hard drive or other persistent data storage device. The system 500 may also include one or more cache memories (not shown) that provide temporary storage of at least some program code in order to reduce the number of times program code must be retrieved from the bulk storage device 510 during execution.

As shown in FIG. 5, the memory elements 504 may store a driving dynamics control module 520, which may implement one or more of the operations illustrated in FIGS. 3, 4A, and 4B, for example. In various embodiments, the module 520 may be stored in the local memory 508, the one or more bulk storage devices 510, or apart from the local memory and the bulk storage devices. It should be appreciated that the system 500 may further execute an operating system (not shown in FIG. 5) that can facilitate execution of the module 520. The module 520, being implemented in the form of executable program code and/or data, can be read from, written to, and/or executed by the system 500, e.g., by the processor 502. Responsive to reading from, writing to, and/or executing the module 520, the system 500 may be configured to perform one or more operations or method steps described herein.

Input/output (I/O) devices depicted as an input device 512 and an output device 514, optionally, may be coupled to the system. Examples of input devices may include, but are not limited to, a keyboard, a pointing device such as a mouse, or the like. Examples of output devices may include, but are not limited to, a monitor or a display, speakers, or the like. In some implementations, the system may include a device driver (not shown) for the output device 514. Input and/or output devices 512, 514 may be coupled to the system 500 either directly or through intervening I/O controllers. Additionally, sensing devices 515, may be coupled to the system 500. Examples of sensing devices 515 may include, but are not limited to, cameras (located inside and/or outside the vehicle), LIDARs, RADARS, scales, Quick Response (QR) code readers, bar code readers, RF sensors, and others. Sensing devices 515 may be coupled to the system 500 either directly or through intervening controllers and/or drivers.

Cameras may be implemented using high-resolution imagers with fixed mounting and field of view. LIDARs may be implemented using scanning LIDARs with dynamically configurable field of view that provides a point-cloud of the region intended to scan. RADARs may be implemented using scanning RADARs with dynamically configurable field of view.

In an embodiment, the input and the output devices may be implemented as a combined input/output device (illustrated in FIG. 5 with a dashed line surrounding the input device 512 and the output device 514). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 516 may also, optionally, be coupled to the system 500 to enable it to become coupled to other systems, computer systems, remote network devices, and/or remote storage devices through intervening private or public networks. The network adapter may comprise a data receiver for receiving data that is transmitted by said systems, devices and/or networks to the system 500, and a data transmitter for transmitting data from the system 500 to said systems, devices and/or networks. Modems, cable modems, and Ethernet cards are examples of different types of network adapter that may be used with the system 500.

Example 1 is a method including determining a dispatch state of a vehicle traversing a current route based on data available from a fleet management system associated with the vehicle; selecting a driving dynamics mode for the vehicle based on the determined dispatch state, wherein the driving dynamics mode determines at least one of a route the vehicle is directed to traverse and a driving behavior of the vehicle; and operating the vehicle in the selected driving dynamics mode.

In Example 2, the method of Example 1 may further include monitoring the dispatch state of the vehicle.

In Example 3, the method of Example 2 may further include detecting a change in the dispatch state of the vehicle; subsequent to the detecting, determining a new dispatch state of the vehicle; selecting a new driving dynamics mode for the vehicle based on the determined new dispatch state; and operating the vehicle in the selected new driving dynamics mode.

In Example 4, the method of any of Examples 1-3 may further include the selected driving dynamics mode comprising one of a normal driving dynamics mode and a reduced driving dynamics mode.

In Example 5, the method of Example 4 may further include, when the current dispatch state of the AV is determined to be a dispatched state, the selected driving dynamics mode comprising the normal driving dynamics mode.

In Example 6, the method of Example 4 may further include, when the current dispatch state of the AV is determined to be an awaiting dispatch state, the selected driving dynamics mode comprising the reduced driving dynamics mode.

In Example 7, the method of Example 6 may further include operating the vehicle in the reduced driving dynamics mode comprising operating the vehicle in a manner that reduces at least one of an average operational speed and an acceleration rate of the vehicle.

In Example 8, the method of Example 7 may further include the operating the vehicle in the reduced driving dynamics mode comprising redirecting the vehicle from the current route to a more congested route.

In Example 9, the method of Example 7 may further include the operating the vehicle in the reduced driving dynamics mode comprising parking the vehicle.

In Example 10, the method of Example 9 may further include, prior to the parking the vehicle, determining using a mapping system associated with the vehicle whether parking is available within a predetermined distance and if not, redirecting the vehicle from the current route to a new route having slower traffic than the current route.

In Example 11, the method of Example 7 may further include the operating the vehicle in the reduced dynamics mode comprising reducing at least one of the speed of the vehicle and the acceleration rate of the vehicle along the current route.

In Example 12, the method of Example 10 may further include, prior to the reducing at least one of the speed of the vehicle and the acceleration rate of the vehicle, using a perception system of the vehicle to determine an environment of the vehicle and reducing at least one of the speed of the vehicle and the acceleration rate of the vehicle if no other vehicles are detected behind the vehicle along the current route.

In Example 13, the method of Example 12 may further include, if other vehicles are detected behind the vehicle along the current route, operating the vehicle in the normal driving dynamics mode.

Example 14 is a method comprising determining by a fleet management system whether an autonomous vehicle (AV) traversing a current route is eligible for operation in a reduced driving dynamics mode; if the AV is determined to be eligible for operation in the reduced driving dynamics mode, causing the AV to operate in the reduced driving dynamics mode while a dispatch state of the AV comprises awaiting dispatch to a destination; wherein the causing the AV to operate in the reduced driving dynamics mode comprises operating the AV in a manner that reduces at least one of an average operational speed of the AV and an acceleration rate of the AV.

In Example 15, the method of Example 14 may further include the operating the AV in a manner that reduces at least one of the average operational speed of the AV and the acceleration rate of the AV comprising at least one of redirecting the AV to a new route, reducing at least one of the speed of the AV and the acceleration rate of the AV along the current route, and parking the AV.

In Example 16, the method of Example 14 may further include AVs comprising a subset of the fleet of AVs being eligible for operation in the reduced driving dynamics mode.

In Example 17, the method of Example 16 may further include the AVs comprising the subset of AVs being selected based on at least one of a battery charge level of the AV and a battery health of the AV.

Example 18 is an autonomous vehicle ("AV") comprising an onboard computer; a perception system for perceiving an operational environment of the AV traversing a current route; and a driving dynamics control system configured to cause the AV to operate in a reduced driving dynamics mode while the AV is awaiting dispatch to a destination, wherein the causing the AV to operate in the reduced driving dynamics mode comprises operating the AV in a manner that reduces at least one of an average operational speed of the AV and an acceleration rate of the AV.

In Example 19, the AV of Example 18 may further include the operating the AV in a manner that reduces at least one of the average operational speed of the AV and the acceleration rate of the AV comprising at least one of redirecting the AV to a new route, reducing at least one of the speed of the AV and the acceleration rate of the AV along the current route, and parking the AV.

In Example 20, the AV of Example 19 may further include the reducing the at least one of the speed of the AV and the acceleration rate of the AV along the current route further comprising using the perception system to detect whether there are vehicles driving behind the AV along the current route and refraining from reducing the at least one of the speed of the AV and the acceleration rate of the AV along the current route if the perception system detects vehicles driving behind the AV along the current route.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGS. may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGS. and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to contactless current measurement using magnetic sensors, e.g. those summarized in the one or more processes shown in FIGS., illustrate only some of the possible functions that may be executed by, or within, the current measurement systems illustrated in the FIGS. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method or process described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method comprising:
   determining a dispatch state of a vehicle traversing a current route based on data available from a fleet management system associated with the vehicle;
   determining whether the vehicle is eligible for operation in a reduced driving dynamics mode based on whether a number of other vehicles of a fleet of vehicles managed by the fleet management system that are operating in the reduced driving dynamics mode exceeds a predetermined threshold;
   in response to determining that the vehicle is eligible for operation in the reduced driving dynamics mode:

selecting a driving dynamics mode for the vehicle based on the determined dispatch state, wherein the driving dynamics mode determines at least one of a route the vehicle is directed to traverse and a driving behavior of the vehicle; and operating the vehicle in the selected driving dynamics mode;

wherein the selected driving dynamics mode comprises one of a normal driving dynamics mode and a reduced driving dynamics mode;

wherein the operating the vehicle in the reduced driving dynamics mode comprises operating the vehicle in a manner that reduces an average operational speed to a non-zero speed; and wherein the operating the vehicle in the reduced driving dynamics mode comprises at least one of:

redirecting the vehicle from the current route to a new route having a higher concentration of traffic than the current route, and redirecting the vehicle from a current lane of the current route to a new lane of the current route, the new lane having a higher concentration of traffic than the current lane, wherein the redirecting is performed with reference to real-time traffic information received from other vehicles in the fleet of vehicles.

2. The method of claim 1 further comprising monitoring the dispatch state of the vehicle.

3. The method of claim 2 further comprising:
detecting a change in the dispatch state of the vehicle;
subsequent to the detecting, determining a new dispatch state of the vehicle;
selecting a new driving dynamics mode for the vehicle based on the determined new dispatch state; and
operating the vehicle in the selected new driving dynamics mode.

4. The method of claim 1, wherein when the dispatch state of the vehicle is determined to be a dispatched state, the selected driving dynamics mode comprises the normal driving dynamics mode.

5. The method of claim 1, wherein when the dispatch state of the vehicle is determined to be an awaiting dispatch state, the selected driving dynamics mode comprises the reduced driving dynamics mode.

6. The method of claim 1, wherein the operating the vehicle in the reduced driving dynamics mode comprises:
locating an available on-street parking spot within a predetermined distance from a current location of the vehicle; and
parking the vehicle in the located available on-street parking spot.

7. The method of claim 6 further comprising, prior to the parking the vehicle, determining using a mapping system associated with the vehicle whether on-street parking is available within a predetermined distance and if not, redirecting the vehicle from the current route to a new route having slower traffic than the current route.

8. The method of claim 1, wherein the operating the vehicle in the reduced dynamics mode comprises reducing at least one of a speed of the vehicle and the acceleration rate of the vehicle along the current route.

9. The method of claim 7 further comprising, prior to the reducing at least one of the speed of the vehicle and the acceleration rate of the vehicle, using a perception system of the vehicle to determine an environment of the vehicle and reducing at least one of the speed of the vehicle and the acceleration rate of the vehicle if no other vehicles are detected behind the vehicle along the current route.

10. The method of claim 9 further comprising, if other vehicles are detected behind the vehicle along the current route, operating the vehicle in the normal driving dynamics mode.

11. A method comprising:
determining by a fleet management system whether an autonomous vehicle (AV) traversing a current route is eligible for operation in a reduced driving dynamics mode based on whether a number of other AVs of a fleet of AVs managed by the fleet management system that are operating in the reduced driving dynamics mode exceeds a predetermined threshold;
in response to determining that the AV is eligible for operation in the reduced driving dynamics mode, causing the AV to operate in the reduced driving dynamics mode while a dispatch state of the AV comprises awaiting dispatch to a destination;
wherein the causing the AV to operate in the reduced driving dynamics mode comprises:
operating the AV in a manner that reduces an average operational speed of the AV to a non-zero speed; and
at least one of:
redirecting the AV from the current route to a new route having a higher concentration of traffic than the current route, and
redirecting the AV from a current lane of the current route to a new lane of the current route, the new lane having a higher concentration of traffic than the current lane,
wherein the redirecting is performed with reference to real-time traffic information received from other AVs of the fleet of AVs; and
wherein the AV comprises one of the fleet of AVs managed by the fleet management system.

12. The method of claim 11, wherein AVs comprising a subset of the fleet of AVs are eligible for operation in the reduced driving dynamics mode.

13. The method of claim 12, wherein the AVs comprising the subset of AVs are selected based on at least one of a battery charge level of the AV and a battery health of the AV.

14. The method of claim 11, wherein the causing the AV to operate in the reduced driving dynamics mode further comprises locating an available on-street parking spot within a predetermined distance from a current location of the AV and parking the AV in the located available on-street parking spot.

15. An autonomous vehicle ("AV") managed by a fleet management system, the AV comprising:
an onboard computer;
a perception system for perceiving an operational environment of the AV traversing a current route; and
a driving dynamics control system configured to cause the AV to operate in a reduced driving dynamics mode while the AV is awaiting dispatch to a destination and while a number of other AVs of a fleet of AVs managed by the fleet management system that are operating in the reduced driving dynamics mode does not exceed a predetermined threshold, wherein the causing the AV to operate in the reduced driving dynamics mode comprises:
operating the AV in a manner that reduces an average operational speed of the AV to a non-zero speed, and
at least one of:

redirecting the AV from the current route to a new route having a higher concentration of traffic than the current route, and redirecting the AV from a current lane of the current route to a new lane of the current route, the new lane having a higher concentration of traffic than the current lane, wherein the redirecting is performed with reference to real-time traffic information received from other AVs in the fleet of AVs.

16. The AV of claim 15, wherein the reducing the average operational speed of the AV to the non-zero speed further comprises using the perception system to detect whether there are vehicles driving behind the AV along the current route and refraining from reducing the average operational speed of the AV to the non-zero speed in response to the perception system detecting vehicles driving behind the AV along the current route.

17. The AV of claim 15, wherein the causing the AV to operate in the reduced driving dynamics mode further comprises locating an available on-street parking spot within a predetermined distance from a current location of the AV and parking the AV in the located available on-street parking spot.

* * * * *